United States Patent [19] [11] 3,755,303
Nathansohn [45] Aug. 28, 1973

[54] STEROIDO(16 ALPHA, 17 ALPHA-D)-OXAZOLINES AND THEIR PREPARATION
[75] Inventor: Giangiacomo Nathansohn, Milan, Italy
[73] Assignee: Gruppo Lepetit S.p.A., Milan, Italy
[22] Filed: June 24, 1971
[21] Appl. No.: 156,538

[52] U.S. Cl........ 260/239.55, 260/397.45, 260/349
[51] Int. Cl.................. C07c 173/00, C07c 173/10
[58] Field of Search............................... 260/239.55

[56] References Cited
UNITED STATES PATENTS
3,631,033   12/1971   Nathansohn et al........... 260/239.55

Primary Examiner—Elbert L. Roberts
Attorney—Theodore Post et al.

[57] ABSTRACT

Steroido[16α,17α-d]oxazolines of the formula

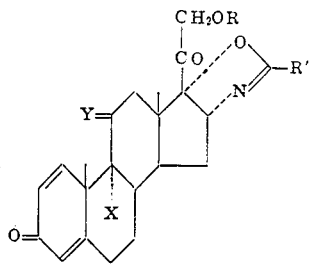

wherein X represents hydrogen or halo; Y represents H(OH) or O; or X and Y together represent a double bond between the carbon atoms in 9 and 11 positions; R represents H or lower acyl; and R' represents lower alkyl.

7 Claims, No Drawings

STEROIDO(16 ALPHA, 17 ALPHA-D)-OXAZOLINES AND THEIR PREPARATION

STATEMENT OF THE INVENTION

This invention concerns new steroido [16α,17α-d] oxazolines represented by the formula:

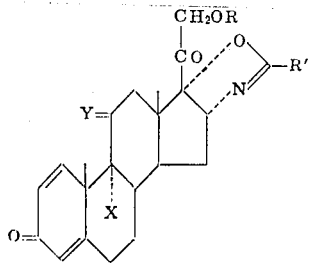

wherein X represents hydrogen or halo; Y represents H(OH) or O; or X and Y together represent a double bond between the carbon atoms in 9 and 11 positions; R represents H or lower acyl; and R' represents lower alkyl. By lower alkyl is meant a 1 to 4 carbon alkyl group, such as, for example, methyl, ethyl, propyl or butyl; by lower acyl is meant a 2 to 4 carbon acyl group, such as, for example, acetyl, propionyl or butyryl; and by halo is meant fluoro, chloro, bromo or iodo.

BACKGROUND OF THE INVENTION

In a paper published in Gazzetta Chimica Italiana 95, 1338, 1965, Nathansohn et al. describe pregnano-oxazoline derivatives in which the oxygen and the nitrogen atoms of the oxazoline moiety have either a 17α, 16α- or 17β, 16β-configuration. In both cases, however, the oxygen atom is attached to the 16 carbon atom while the nitrogen atom is attached to the 17 carbon atom.

The present invention provides a method for preparing novel compounds wherein the oxazoline ring is fused with ring D of the steroid nucleus in such a way that the nitrogen atom is attached to the 16α-position and the oxygen atom is attached to the 17α-position of the steroid nucleus. To prepare these novel compounds, the introduction of a 16α-amino group, or a group equivalent to it, in the pregnane ring was needed. This represented a previously insurmountable difficulty since it was known from the prior art that the reactions for introducing a convenient precursor of the amino group led to undesired compounds. Thus, for instance, ring opening by azide ions of 16α-, 17α-epoxides of the pregnane series gives only 16β-azido derivatives, while ring opening of 16β-, 17β-epoxides gives 17α- and 17β-azido derivatives.

DESCRIPTION OF THE PREFERRED EMBODIMENTS

We have now found that a convenient method for introducing a 16α-amino group in the pregnane nucleus is by way of 16β-chloroamino formation. In this method, 3β-, 17β-dihydroxy-16β-azido-5α-pregnane-11,20-dione is used as a starting material. This compound, after diacylation in 3- and 17-positions is reduced with Raney nickel under a hydrogen atmosphere to the corresponding 16β-amino-3β,17α-dihydroxy-5α-pregnane-11,20-dione-3,17-diacylate. The 16β-amino pregnane is then converted by treatment with N-chlorosuccinimide or t-butyl hypochlorite into the 16β-chloroamino compound which, after heating in dimethyl formamide (DMF) in the presence of a potassium salt of a 2 to 4 carbon monocarboxylic acid, surprisingly gives 16-acylamido-3β,17α-dihydroxy-5α-pregn-15-en-11,20-dione-3-acylate according to the following scheme:

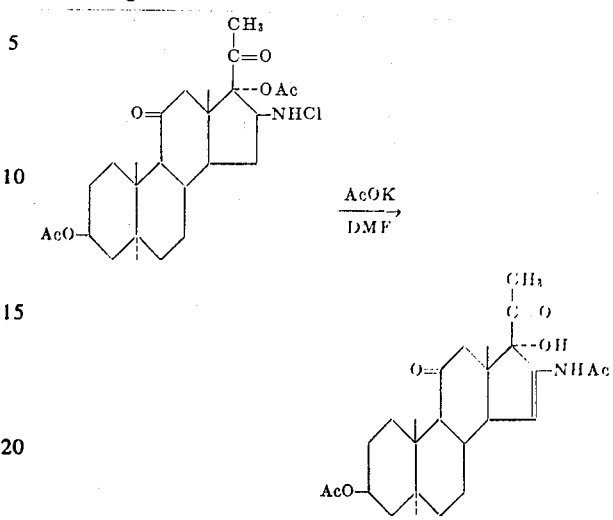

where the symbol Ac stands for lower acyl. During this step, hydrogen chloride is eliminated and the lower acyl group migrates from the oxygen to the nitrogen atom. At the same time, a double bond between $C_{15}$ and $C_{16}$ is formed. The resulting pregn-15-en derivative is then hydrogenated, using palladiated charcoal as a catalyst, to give a mixture of 65–70 percent of the 16α-amido-derivative and 30–35 percent of the 16β-amido-derivative. The ratio of these two compounds is determined by nuclear magnetic resonance (NMR) absorption measurements. The 16α-amido compound may be obtained in pure form by crystallization from methanol. The pure α-amido or, alternatively, the α,β-mixture is then cyclized by refluxing a solution thereof in an appropriate organic solvent, such as, for instance, benzene, toluene or xylene.

When the α,β-mixture is used, the separation of the steroido [16α,17α-d]oxazoline does not present particular difficulties since only the α-isomer undergoes cyclization while the 16β-amido steroid does not. The pure steroido [16α,17α-d]oxazolines are obtained in this case by chromatographing the solution of the crude mixture on silica gel. The following scheme summarizes the ring closure step:

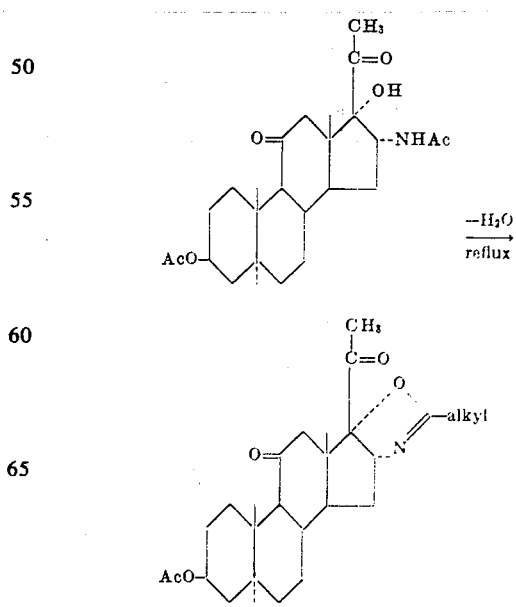

Reduction of the 11-keto to an 11β-hydroxy group is then easily carried out with sodium borohydride as reductant, first protecting the 20-keto group by transforming it into the corresponding semicarbazone in the usual way. During the reduction step, the hydrolysis of the 3β-acyloxy group is promoted by the strongly basic aqueous solution of sodium borohydride. The so-obtained 11β-hydroxy-20-keto-pregnane-[16α,17α-d]oxazoline semi-carbazone is hydrolyzed by treatment with hydrochloric acid. Under these conditions, an elimination reaction takes place simultaneously with double bond formation between positions 9 and 11. The reaction pathway is outlined in the following scheme:

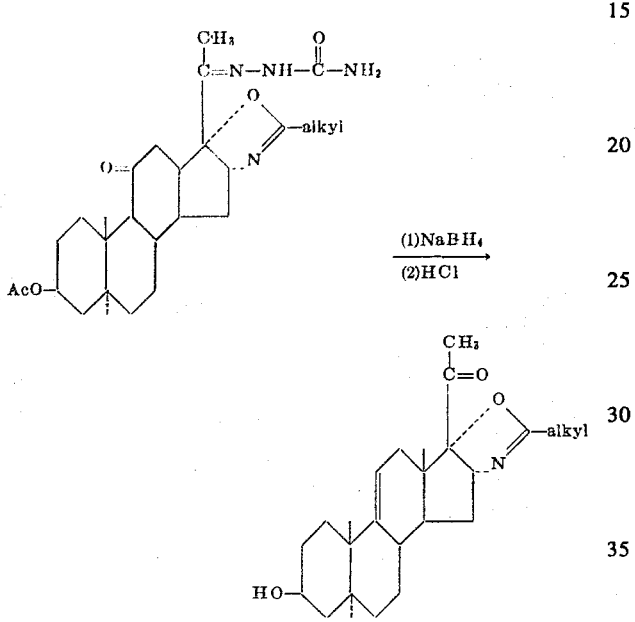

The last indicated compound is transformed into the corresponding 21-acylate by iodination of the 21-carbon atom in the presence of calcium oxide and azobis-isobutyronitrile followed by exchange between the iodine atom and acylate ion in the presence of triethylamine. The so obtained 3,21-dihydroxy-5α-pregn-9(11)-ene-20-one-[16α,17α-d]-2'-methyloxazoline-21-acylate is then oxidized with chromic acid to the corresponding 3-keto-derivative which, after bromination in positions 2 and 4 and treatment with lithium carbonate in the presence of lithium bromide using dimethylformamide as a solvent, is transformed into the corresponding 1,4,9(11)-pregnatriene derivative

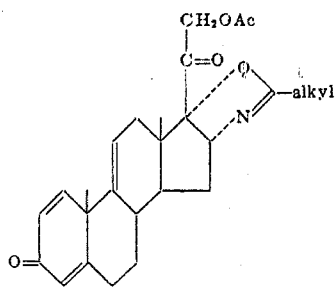

To obtain 9α-halo-11β-hydroxy derivatives, the following procedures are utilized:
a. the 1,4,9(11)-triene derivative is treated with N-bromoacetamide to give the 9α-bromo-11β-hydroxy steroid;
b. the latter is dehydrohalogenated with potassium acetate in an anhydrous solvent and
c. the so-obtained 9β,11β-epoxysteroid is opened with hydrogen fluoride.

The three above-mentioned steps are carried out in usual ways with reactions which are familiar to steroid chemists.

Representative compounds which are prepared by procedures as described above are the following:

1,4-pregnadiene-9α-fluoro-11β,21-diol-3,20-dione[16α,17α-d]-2'-methyloxazoline-21-butyrate;

1,4-pregnadiene-9α-fluoro-11β,21-diol-3,20-dione[16α,17α-d]-2'-methyloxazoline-21-acetate;

1,4-pregnadiene-9α-fluoro-11β,21-diol-3,20-dione[16α,17α-d]-2'-ethyloxazoline-21-acetate;

1,4-pregnadiene-9α-fluoro-11β,21-diol-3,20-dione[16α,17α-d]-2'-ethyloxazoline-21-acetate;

1,4-pregnadiene-9α-fluoro-11β,21-diol-3,20-dione[16α,17α-d]-2'-butyloxazoline-21-acetate;

1,4-pregnadiene-9α-fluoro-11β-diol-3,20-dione[16α,17α-d]-2'-butyloxazoline-21-acetate;

1,4-pregnadiene-9α-fluoro-21-ol-3,11,20-trione[16α,17α-d]-2'-methyloxazoline-21-acetate;

1,4-pregnadiene-9α-fluoro-21-ol-3,11,20-triene[16α,17α-d]-2'-methyloxazoline-21-acetate;

1,4-pregnadiene-9α-fluoro-21-ol-3,11,20-trione[16α,17α-d]-2'-ethyloxazoline-21-acetate;

1,4-pregnadiene-9α-fluoro-21-ol-3,11,20-trione[16α,17α-d]-2'-ethyloxazoline-21-acetate;

1,4-pregnadiene-9α-fluoro-21-ol-3,11,20-trione[16α,17α-d]-2'-butyloxazoline-21-acetate;

1,4-pregnadiene-9α-fluoro-21-ol-3,11,30-trione[16α,17α-d]-2'-butyloxazoline-21-acetate;

1,4-pregnadiene-11,21-diol-3,20-dione[16α,17α-d]-2'-methyloxazoline-21-acetate;

1,4-pregnadiene-11,21-diol-3,20-dione[16α,17α-d]-2'-ethyloxazoline-21-acetate;

1,4-pregnadiene-11,21-diol-3,20-dione[16α,17α-d]-2'-butyloxazoline-21-acetate;

1,4-pregnadiene-21-ol-3,11,20-trione[16α,17α-d]-2'-methyloxazoline-21-proprionate;

1,4-pregnadiene-21-ol-3,11,20-trione[16α,17α-d]-2'-butyloxazoline-21-acetate.

All of the compounds of the present invention exhibit a high degree of anti-inflammatory activity associated with a low order of toxicity. Those compounds which have 9-fluoro substitution are most effective. For example, the compound 1,4-pregnadiene-9α-fluoro-11β,21-diol-3,20-dione-[16α,17α-d]-2'-methyloxazoline-21-acetate, showed an activity in the granuloma pellet test in rats about 10 times that of hydrocortisone. The antigranulomatous activity was evaluated on adrenalectomized rats after oral administration of a dose of 0.30 mg/kg of the compound. Under these conditions, a decrease of the granuloma was found to be of about 30 percent while 3 mg/kg of hydrocortisone reduced the formation of the granuloma by 32 percent.

The inventive compounds also have a glucorticoid activity. In representative experiments carried out according to the procedure of Olson et al., Endocrinology 35, 40, 1944, 50 μg/rat, s.c., of the compound 1,4-pregnadiene-9α-fluoro-11β,21-diol-3,20-dione-[16α,17α-d]-2'-methyloxazoline-21-acetate was found to increase the liver glycogen from a value of about 1-2 to about 17–18. The values are expressed as mg. of glucose per 100 g. of body weight of the rats. The other compounds of this invention also show a comparable activity.

The following examples describe procedures used in preparations of representative compounds of this invention.

EXAMPLE 1

5α-Pregnane-16α,17α-epoxy-3β-ol-11,20-dione

To a solution of 150 g. of 5α-pregn-16-en-3β-ol-11,20-dione-3-propionate in 3,500 ml. of tert-butanol, 75 g. of KOH dissolved in 600 ml. of water is added, and the mixture is refluxed for 2 hours in a nitrogen atmosphere. After cooling, 450 ml. of hydrogen peroxide, 35.5 percent w/v, is added and the mixture is stirred for 6 hours at room temperature. After addition of acetic acid to neutrality, the solvent is removed in vacuo and the residue is collected and dried. Yield 134.5 g. (100%), melting at 177°–178°C.

EXAMPLE 2

5α-Pregnane-16β-azido-3β,17β-diol-11,20-dione

A mixture of 50 g. of 5α-pregnane-16α,17α-epoxy-3β-ol-11,20-dione 400 ml. of dimethylformamide, 7.15 g. of $H_2SO_4$, 80 ml. of water and 75 g. of sodium azide is refluxed for 2 hours and, while still hot, a solution of 300 ml. of saturated aqueous sodium bicarbonate is added, followed by 1,700 ml. of water. After stirring for 1 hour, the precipitate is collected and dried. Yield 52 g. (92%) of the above-named product, melting at 221°–223°C, which is sufficiently pure for the subsequent step. A purified sample melts at 229°–231°C, $[\alpha]_D^{20} + 114.3°$ (CHCl$_3$).

EXAMPLE 3

5α-Pregnane-16β-azido-3β,17α-diol-11,20-dione-3,17-diacetate

A mixture of 250 g. of the crude 16β-azido-steroid, prepared as in Example 2, 700 ml. of acetic acid, 550 ml. of acetic anhydride and 37 g. of p-toluenesulfonic acid is heated for 75 minutes on a water bath and then poured into 4,000 ml. of water. The collected diacetate is recrystallized from ethanol. Yield 216 g. (71%), melting at 204°–206°C, $[\alpha]_D^{20} + 37.5°$ (CHCl$_3$).

EXAMPLE 4

5α-Pregnane-16β-amino-3β,17α-diol-11,20-dione-3,17-diacetate

A mixture of 300 g. of the diacetate product of Example 3, 10,000 ml. of ethyl acetate and 300 g. of Raney nickel is hydrogenated under a hydrogen stream for 5 hours, then the mixture is filtered and the filtrate is evaporated to a volume of about 8,000 ml. The precipitate is collected and dried. Yield 205 g. (72%), melting at 191°–195°C, $[\alpha]_D^{20} + 22°$ (CHCl$_3$).

EXAMPLE 5

5α-Pregnane-16β-chloroamino-3β,17α-diol-11,20-dione-3,17-diacetate

A mixture of 162 g. of the 16β-amino steroid product of Example 4, 2,600 ml. of dichloromethane and 55 g. of N-chlorosuccinimide is stirred at room temperature for 15 minutes, washed with water, dried over sodium sulfate and filtered. The filtrate is evaporated to dryness in vacuo. Yield, 135 g. (78%), melting at 176°–182°C, $[\alpha]_D^{20} + 66.3°$ (CHCl$_3$).

EXAMPLE 6

5α-Pregn-15-en-16-acetamido-3β,17α-diol-11,20-dione-3-acetate

A mixture of 55 g. of the product obtained as in Example 5, 40.5 g. of potassium acetate and 500 ml. of dimethyl formamide is heated to 95°–100°C for 0.5 hour under nitrogen, cooled to about 40°C and diluted with 2,500 ml. of water. The precipitate is collected, washed, dried and recrystallized from acetone. Yield 25 g. (49%), melting at 241°–245°C, $[\alpha]_D^{20} + 41.3°$ (CHCl$_3$).

EXAMPLE 7

5α-Pregnane-16α-acetamido-3β,17α-diol-11,20-dione-3-acetate

An amount of 50 g. of 5α-pregn-15-en-16-acetamido-3β,17α-diol-11,20-dione-3-acetate and 12.5 g. of 10 percent palladium on charcoal in 2,000 ml. of acetic acid is hydrogenated for 3.5 hours, then filtered. The filtrate is evaporated to dryness, the residue is treated with aqueous sodium bicarbonate, collected, water-wahsed to removed sodium bicarbonate and dried. The crude product, consisting of a mixture of 16α- and 16β-acetamido derivative, is dissolved in 1,200 ml. of hot methanol and filtered, the filtrate is concentrated to about 700 ml. and cooled. Yield 24 g. (48%), m.p. 242°–246°C, $[\alpha]_D^{20} - 14.5°$ (CHCl$_3$).

EXAMPLE 8

5α-Pregnane-3β-ol-11,20-dione-[16α,17α-d]-2'-methyloxazoline-3-acetate

A mixture of 21.4 g. of 5α-pregnane-16α-acetamido-3β,17α-diol-11,20-dione-3-acetate, 10.7 g. of p-toluene-sulfonic acid, 110 ml. of chloroform and 1,100 ml. of benzene is boiled until 200 ml. of liquid are distilled over, then refluxed for 1 hour and finally evaporated to dryness. The residue is dissolved in ethyl acetate, washed with aqueous sodium bicarbonate and with water and evaporated to dryness. Yield 12.5 g. (62%), m.p. 273°–276°C, $[\alpha]_D^{20} + 93.6°$ (CHCl$_3$).

EXAMPLE 9

5α-Pregnane-3β-ol-11,20-dione-[16α,17α-d]-2'-methyloxazoline-3-acetate-20-semicarbazone To a boiling solution of 70 g. of 5α-pregnane-3β-ol-11,20-dione-[16α,17α-d]-2'-methyloxazoline-3-acetate in 2,000 ml. of methanol is added a solution of 56 g. of semicarbazide hydrochloride, 41.3 ml. of pyridine and 350 ml. of water. The mixture is refluxed for 2 hours. After evaporation to dryness and addition of 2,000 ml. of water, the solids are collected and dried. Yield 77 g. (97%).

Example 10

5α-Pregnane-3β,11β-diol-20-one-[16α,17α-d]-2'-methyloxazoline-3-acetate-20-semicarbazone To a solution of 77 g. of the semicarbazone prepared as in Example 9, dissolved in 2,000 ml. of ethanol, warmed and held at 60°C in a nitrogen atmosphere is added a solution of 33 g. of potassium bicarbonate in 330 ml. of water followed by the portionwise addition of 20 g. of sodium borohydride. After refluxing for 40 minutes, an additional amount of 20 g. of sodium borohydride is added and refluxing is continued for 2 hours. After cooling, 210 ml. of acetic acid is gradually added to the reaction mixture and the ethanol is distilled off. The residual aqueous solution is neutralized with aqueous sodium bicarbonate and the precipitate is collected and dried. Yield 55 g. (78%), m.p. 256°–257°C.

EXAMPLE 11

5α-Pregn-9(11)-en-3β-ol-20-one-[16α,17α-d]-2'-methyloxazoline

A mixture of 93 g. of the semicarbazone prepared as in Example 10 and 1,400 ml. of aqueous 25 percent hydrochloric acid is allowed to stand at room temperature for 22 hours, then made slightly alkaline by adding aqueous sodium hydroxide, extracted with chloroform, washed, dried and evaporated to dryness. The crude product (76.9 g.) is dissolved in hot chloroform, filtered after cooling and the filtrate is chromatographed through silica gel, using chloroform as the eluent. Yield 55 g. (71%), m.p. 208°–211°C, $[\alpha]_D^{20}$ + 64.8° (CHCl$_3$).

EXAMPLE 12

5α-Pregn-9(11)-en-3β-ol-20-one-21-iodo-[16α,17α-d]-2'-methyloxazoline

To a mixture of 20 g. of 5α-pregn-9(11)-en-3β-ol-20-one[16α,17α-d]-2'-methyloxazoline, 0.4 g. of azo-bis-isobutyronitrile, 30 g. of calcium oxide, 150 ml. of methanol and 150 ml. of tetrahydrofuran is added gradually a solution of 20 g. of iodine in 100 ml. of tetrahydrofuran and 60 ml. of methanol. The reaction mixture is stirred for 1 hour. The calcium oxide is filtered off, the filtrate is concentrated to about 100 ml., then a solution of 15 g. of sodium bisulfite in 500 ml. of water is added, followed by 200 ml. of aqueous 5 percent acetic acid. The precipitate is collected and dried and passed in crude state to the subsequent step.

EXAMPLE 13

5α-Pregn-9(11)-en-3β,21-diol-20-one-[16α,17α-d]-2'-methyloxazoline-21-acetate

The crude 21-iodo derivative of Example 12, dissolved in 500 ml. of acetone, is added to a previously prepared solution of 200 ml. of triethylamine in 55 ml. of acetone and 110 ml. of acetic acid, and the mixture is refluxed for 75 minutes. The acetone is then removed by distillation and 1,500 ml. of cold water is added. The precipitate is collected and dried. Yield 18 g. (78% calculated on the 21-unsubstituted starting compound), m.p. 263°–271°C, $[\alpha]_D^{20}$ + 36.08° (CHCl$_3$).

EXAMPLE 14

5α-Pregn-9(11)-en-3,20-dione-21-ol-[16α,17α-d]-2'-methyloxazoline-21-acetate

To a suspension of 36 g. of 5α-pregn-9(11)-en- 3β,21-diol-20-one-[16α,17α-d]-2'-methyloxazoline in 2,000 ml. of acetone, 30 ml. of 8N chromic acid is added, followed in 10 minutes by an additional 21.4 ml. of 8N chromic acid solution, then, 10 minutes later, by 1,000 ml. of water and, finally, by a solution of 30 g. of sodium bicarbonate in 1,000 ml. of water. The reaction temperature is always kept between 10° and 15°C. After 0.5 hour about 500 ml. of acetone is distilled off in vacuo and the product precipitate is collected. A crude product is obtained which is dissolved in 800 ml. of hot acetone, filtered, the filtrate concentrated to about 150 ml. then diluted with 500 ml. of hexane. The resulting precipitated product is collected and dried. Yield 20.4 g. (64%), m.p. 209°– 214°C, $[\alpha]_D^{20}$ + 53.4° (CHCl$_3$).

EXAMPLE 15

2,4-Dibromo-5α-pregn-9(11)-en-21-ol-3,20-dione-[16α,17α-d]-2'-methyloxazoline-21-acetate To a solution of 4.2 g. of bromine in 60 ml. of dioxane add 8 ml. of a 26.3 percent hydrogen bromide solution in acetic acid followed by 5 g. of 5α-pregn-9(11)-en-3,20-dione-21-ol-[16α,17α-d]-2'-methyloxazoline-21-acetate dissolved in 80 ml. of dioxane. After being stirred 1 hour at room temperaure, the reaction mass is poured into 1,200 ml. of ice water containing 30 g. of sodium bicarbonate. The precipitate is collected and dried and used in the crude state for the following step.

EXAMPLE 16

1,4,9(11)-Pregnatriene-21-ol-3,20-dione-[16α,17α-d]-2'-methyloxazoline-21-acetate The 2,4-dibromo product of Example 15 dissolved in 38.6 g. of dimethyl acetamide is added to a mixture, held at 100°C, of 2.1 g. of lithium bromide, 4.05 g. of lithium carbonate and 58 ml. of dimethyl acetamide, and the mixture is heated for 12 hours under a nitrogen atmosphere. After cooling, the mass is poured into 1,000 ml. of a saturated sodium chloride solution and 40 ml. of acetic acid. After adjusting the suspension to pH about 7 with sodium bicarbonate, the precipitate is collected and dried. The product is purified by chromatography through silica gel in chloroform solution, m.p. 186°–189°C, $[\alpha]_D^{20}$ + 25.4° (CHCl$_3$).

EXAMPLE 17

1,4-Pregnadiene-9α-bromo-11β,21-diol-3,20-dione-[16α,17α-d]-2'-methyloxazoline-21-acetate To 3 g. of 1,4,9(11)-pregnatrien-21-ol-3,20-dione[16α,17α-d]-2'-methyloxazoline-21-acetate in 36 ml. of tetrahydrofuran, cooled at 5°C, 15.2 ml. of 4.9 percent perchloric acid is added, followed by 1.32 g. of N-bromoacetamide. After stirring 4 hours at 5°C, a 10 percent aqueous solution of sodium bisulfite is added, and the solution is diluted with 400 ml. of ice water. The resulting precipitate is collected and dried, then it is sludged with cold methanol. Yield 1.65 g.

EXAMPLE 18

1,4-Pregnadiene-9β,11β-epoxy-21-ol-3,20-dione-[16α,17α-d]-2'-methyloxazoline-21-acetate The 9α-bromo compound of Example 17 is refluxed for 10 hours with 66 ml. of acetone and 2.75 g. of potassium acetate. After cooling, water and chloroform are added and the chloroform layer is separated and evaporated to dryness. The residue is crystallized from a mixture of methanol and ethyl ether. Yield 0.46 g., m.p. 186°–189°C, $[\alpha]_D^{20}$ + 77.3° (CHCl$_3$).

EXAMPLE 19

1,4-Pregnadiene-9α-fluoro-11β,β1-diol-3,20-dione-[16α,17α-d]-2'-methyloxazoline-21-acetate At 70°C, 6 g. of HF is dissolved in 10.85 ml. of tetrahydrofuran and to 3.67 ml. of this solution. 0.39 g. of 1,4-pregnadiene-9β,11β-epoxy-21-ol-3,20-dione-[16α,17α-d]-2'-methyloxazoline-21-acetate is added portionwise and the mixture is stirred 6 hours at room temperature. The mixture is then diluted with 6.25 g. of tetrahydrofuran, cooled to 0°C and neutralized with a mixture of 0.45 g. of sodium bicarbonate and 0.35 g. of sodium sulfate. The mass if filtered and the filtrate is evaporated to dryness in vacuo. The residue is dissolved in 20 ml. of acetone, filtered and the filtrate is concentrated to about 5 ml. After addition of 8 ml. of hexane, the precipitate is collected and dried. Yield 0.22 g. (54%), m.p. 268°–270°C, $[\alpha]_D^{20} + 98.4°$ (CHCl₃). Analysis for $C_{25}H_{30}FNO_6$, percent:
Calc. C, 65.35; H, 6.58; N, 3.05;
Found C, 64.83; H, 6.79; N. 3.50.

I claim
1. A compound represented by the formula

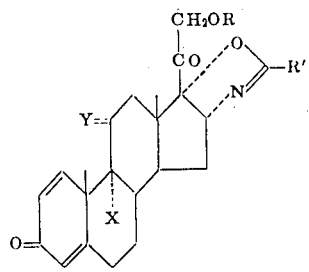

wherein X represents hydrogen or halogen, Y represents H(OH) or O, or X and Y together represent a double bond between the carbon atoms in 9 and 11 positions, R represents hydrogen or lower acyl, and R′ represents lower alkyl.

2. The compound of claim 1 which is 1,4-pregnadiene-9α-fluoro-11β,21-diol-3,20-dione-[16α,17α-d]-2′-methyloxazoline-21-acetate.

3. The intermediate for a compound as claimed in claim 1 which is 5-α-pregnane-16α-acetamido-3β,17α-diol-11,20-dione-3-acetate.

4. Method for preparing a compound as claimed in claim 1 which comprises treating 5α-pregnane-16β-chloroamino-3β,17α-diol-11,20-dione-3,17-diacetate with potassium acetate in dimethylformamide whereby 5α-pregn-15-en-16-acetamido-3β,17α-diol-11,20-dione-3-acetate is formed, hydrogenating the latter using palladiated charcoal as catalyst to give the 5α-pregnane-16α-acetamido derivative, cyclizing the latter by refluxing a solution thereof in an aromatic hydrocarbon solvent to give 5α-pregnane-3β-ol-11,20-dione-[16α,17α-d]-2′-methyloxazoline-3-acetate, reducing the 11-keto group of the latter to an 11β-hydroxy group with sodium borohydride after first protecting the 20-keto group of the compound by forming the 20-semicarbazone, hydrolyzing the 20-semicarbazone compound with hydrochloric acid, the 3β-acyloxy group of said compound having been hydrolyzed during the previous alkaline reduction step to give a 3-hydroxy group whereby 5α-pregn-9(11)-en-3β-ol-20-one-[16α,17α-d]-2′-methyloxazoline is formed, iodinating the 21-carbon atom of the latter in the presence of calcium oxide and azo-bis-isobutyronitrile followed by exchange between the 21-iodo atom and acetate ion in the presence of triethylamine whereby the 21-acetate compound is formed, oxidizing the latter with chromic acid to give the corresponding 3-keto compound, brominating the latter in positions 2 and 4, treating the latter with lithium carbonate in the presence of lithium bromide whereby 1,4,9(11)-pregnatriene-21-ol-3,20-dione-[16α,17α-d]-2′-methyloxazoline-21-acetate is obtained.

5. The method of claim 4 also including the step of treating the product 1,4,9(11)-pregnatriene with N-bromoacetamide and perchloric acid whereby 1,4-pregnadiene-9α-bromo-11β,21-diol-3,20-dione-[16α,17α-d]-2′-methyloxazoline-21-acetate is formed.

6. The method of claim 5 also including the steps of dehydrohalogenating the product 9α-bromo-11β-hydroxy compound by refluxing it with potassium acetate in an anhydrous solvent to form the corresponding 9β,11β-epoxy compound and treating the latter with hydrogen fluoride to open the epoxy ring, whereby 1,4-pregnadiene-9α-fluoro-11β,21-diol-3,20-dione-[16α,17α-]-2′-methyloxazoline-21-acetate is formed.

7. Method for making the compound of claim 3 which comprises treating 5α-pregnane-16β-amino-3β,17α-diol-11,20-dione-3,17-diacetate with N-chlorosuccinimide to form the corresponding 16β-chloroamino compound, heating the latter in dimethyl formamide in the presence of potassium acetate whereby 5α-pregn-15-en-16-acetamido-3β,17α-diol-11,20-dione-3-acetate is formed and hydrogenating the latter using palladiated charcoal as catalyst whereby the compound of claim 3 is formed.

* * * * *

UNITED STATES PATENT OFFICE
CERTIFICATE OF CORRECTION

Patent No. 3,755,303      Dated August 28, 1973

Inventor(s) Giangiacomo Nathansohn

It is certified that error appears in the above-identified patent and that said Letters Patent are hereby corrected as shown below:

Column 2, line 15, in the drawing, delete "C-O" and substitute --C=O--.

Column 6, line 22, delete "wahsed" and substitute --washed--.

line 40, delete "62%" and substitute --61%--.

Column 10, line 32, add --d-- after 17α-.

Signed and sealed this 1st day of January 1974.

(SEAL)
Attest:

EDWARD M. FLETCHER, JR.
Attesting Officer

RENE D. TEGTMEYER
Acting Commissioner of Patents